US012589344B2

(12) United States Patent
Cho et al.

(10) Patent No.: US 12,589,344 B2
(45) Date of Patent: Mar. 31, 2026

(54) VACUUM CLEANER AND MOLD DEVICE

(71) Applicant: SAMSUNG ELECTRONICS CO., LTD., Suwon-si (KR)

(72) Inventors: Kwansik Cho, Suwon-si (KR); Shin Kim, Suwon-si (KR); Jinho Lee, Suwon-si (KR); Chanyoung Park, Suwon-si (KR); Jeasun You, Suwon-si (KR); Jinseol Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 388 days.

(21) Appl. No.: 17/984,577

(22) Filed: Nov. 10, 2022

(65) Prior Publication Data

US 2023/0069205 A1 Mar. 2, 2023

Related U.S. Application Data

(63) Continuation of application No. PCT/KR2021/005786, filed on May 10, 2021.

(30) Foreign Application Priority Data

May 11, 2020 (KR) ......................... 10-2020-0055592

(51) Int. Cl.
*B01D 46/24* (2006.01)
*A47L 9/12* (2006.01)
*B01D 46/00* (2022.01)

(52) U.S. Cl.
CPC ..... *B01D 46/2403* (2013.01); *B01D 46/0002* (2013.01); *A47L 9/12* (2013.01)

(58) Field of Classification Search
CPC B01D 46/00; B01D 46/0002; B01D 46/0004; B01D 46/0005; B01D 46/0001;
(Continued)

(56) References Cited

U.S. PATENT DOCUMENTS 6,442,792 B1 9/2002 Sudou et al.
2008/0078717 A1 4/2008 Shigaesada et al.
(Continued)

FOREIGN PATENT DOCUMENTS

CN 208303613 U 1/2019
JP 03-277312 A 12/1991
(Continued)

OTHER PUBLICATIONS

International Search Report issued in International Application No. PCT/KR2021/005786 dated Sep. 2, 2021.
(Continued)

*Primary Examiner* — C. A. Rivera
(74) *Attorney, Agent, or Firm* — STAAS & HALSEY LLP

(57) ABSTRACT

A vacuum cleaner comprises: a suction part for suctioning external air; a discharge part through which the sucked air is discharged to the outside; a frame along a flow path between the suction part and the discharge part; and a filter including a filter member which is supported by the frame and which separates dust from the suctioned air, wherein the filter member includes: a first filter part spaced from and to be parallel with an opening formed in the frame; a second filter part having one side supported by the frame and another side extended from the one side thereof toward the edge of the first filter part; and a bent part between the edge of the first filter part and the other side of the second filter part, and the thickness of the first filter part or the second filter part is different from the thickness of the bent part.

11 Claims, 14 Drawing Sheets

(58) Field of Classification Search
CPC ......... B01D 46/2403; A47L 9/00; A47L 9/10;
A47L 9/12; A47L 9/125; A47L 9/127;
A47L 9/1641
See application file for complete search history.

(56) References Cited

U.S. PATENT DOCUMENTS

| | | |
|---|---|---|
| 2016/0339363 A1 | 11/2016 | Yost et al. |
| 2021/0212537 A1 | 7/2021 | Cho et al. |

FOREIGN PATENT DOCUMENTS

| | | | | |
|---|---|---|---|---|
| JP | 3211979 | B2 | 9/2001 | |
| JP | 3448410 | B2 | 9/2003 | |
| JP | 3560262 | B2 | 9/2004 | |
| JP | 2008-086893 | A | 4/2008 | |
| JP | 2008-155152 | A | 7/2008 | |
| JP | 2008-264625 | A | 11/2008 | |
| JP | 4743879 | B2 | 8/2011 | |
| JP | 2019-063701 | A | 4/2019 | |
| KR | 10-2000-0076543 | A | 12/2000 | |
| KR | 10-0473635 | B1 | 3/2005 | |
| KR | 10-1427665 | B1 | 8/2014 | |
| KR | 10-2015-0140980 | A | 12/2015 | |
| KR | 10-2016-0044962 | A | 4/2016 | |
| KR | 10-2016/0072912 | A1 | 6/2016 | |
| KR | 10-1770611 | B1 | 8/2017 | |
| KR | 10-2018-0100236 | A | 9/2018 | |
| KR | 10-2072009 | B1 | 1/2020 | |
| WO | WO 2011/130853 | A1 | 10/2011 | |
| WO | WO-2015179800 | A1 * | 11/2015 | ........... B01D 29/111 |
| WO | WO-2020045809 | A1 * | 3/2020 | ............... A47L 5/24 |

OTHER PUBLICATIONS

Written Opinion issued in International Application No. PCT/KR2021/005786 dated Sep. 2, 2021.

Korean Office Action dated Aug. 27, 2025 for Korean Application No. 10-2020-0055592.

* cited by examiner

VACUUM CLEANER AND MOLD DEVICE

CROSS-REFERENCE TO RELATED APPLICATIONS

This application is a continuation application, under 35 U.S.C. § 111(a), of International Application No. PCT/KR2021/005786, filed on May 10, 2021, in the Korean Intellectual Property Office and claiming priority to Korean Patent Application No. 10-2020-0055592 filed on May 11, 2020, in the Korean Intellectual Property Office, the disclosures of which are incorporated by reference herein in their entireties.

BACKGROUND

Field

The disclosure relates to a vacuum cleaner that sucks in air on a floor surface, filters and discharges the air and a mold device for manufacturing a filter provided in the vacuum cleaner, and more specifically relates to a structure regarding rigidity and a filtering function of a filter member used in the filter and the mold device capable of manufacturing the filter member.

Description of Related Art

A vacuum cleaner, as a device that sucks in air from a floor by a motor, removes various foreign substances such as dust, fine dust, bacteria, and mold from the sucked air by a dust collector or filter provided inside a main body and then discharges the air again, is a household appliance that performs a role of cleaning. According to a design method, the vacuum cleaner is provided to not only suck in air but also spray steam to the floor to remove the foreign substances from the floor.

The vacuum cleaner may be implemented in various models according to an applied structure or function. For example, a cyclone type vacuum cleaner forms a rotating airflow in the air and uses a centrifugal force generated by the rotation of the air to separate the foreign substances from the air. Since the vacuum cleaner does not require a dust bag, the vacuum cleaner can be used almost permanently. In addition, a handy or stick type vacuum cleaner has a relatively small size where a filter for filtering the sucked air is also provided with a relatively small size. The filter includes a filter sheet on which a nonwoven fabric, a micro filter, etc. is laminated.

There are several approaches to implement a filter with an improved air filtering function and one of the approaches is to increase a passage area of air in the filter. In view of this, a filter in which a filter sheet having a relatively large passage area of air is required.

SUMMARY

A vacuum cleaner according to an embodiment of the disclosure includes a suction part to suck in air from outside; a discharge part through which the sucked air is discharged to the outside; and a filter, which includes a frame along a flow path between the suction part and the discharge part and a filter member to separate dust from the sucked air, the frame formed to support the filter member. The filter member includes: a first filter part spaced from and parallel to an opening formed in the frame; a second filter part having one side supported by the frame and the another side formed to extend from the one side toward an edge of the first filter part; and a bent part between the edge of the first filter part and the other side of the second filter part, and wherein a thickness of the first filter part or the second filter part is different from a thickness of the bent part.

Also, a diameter of the frame may be greater than a diameter of the first filter part.

Also, the filter member may have the first filter part, the second filter part and the bent part which are integrated.

Also, the first filter part may be upstream along a direction in which the air moves than the frame.

Also, a diameter of the frame may be greater than a diameter of the first filter part.

Also, the filter member may be formed by stacking microfilters among a plurality of mesh sheets.

Also, the bent part may be molded by compressing a region of the filter member by heat.

Also, a mold device includes a first mold; and a second mold to face the first mold and be moveable with respect to the first mold. The first mold includes a seating part formed to a material of a filter member to be used in a filter of a vacuum cleaner; and a first forming part recessed from the seating part to correspond to a shape of the filter member and having a first surface and a first bent surface bent from the first surface, wherein the second mold includes a second forming part having a second surface and a second bent surface respectively having shapes corresponding to the first surface and the first bent surface of the first forming part, wherein the material is molded by being pressed between the first forming part and the second forming part according to a movement of the second mold, and wherein while the material is pressed, a gap between the first surface of the first forming part and the second surface of the second forming part is different from a gap between the first bent surface of the first forming part and the second bent surface of the second forming part.

Also, the gap between the first surface of the first forming part and the second surface of the second forming part may be greater than the gap between the first bent surface of the first forming part and the second bent surface of the second forming part.

Also, the mold device may further include a heater for applying heat to the first forming part and the second forming part, wherein the first surface of the first forming part and the second surface of the second forming part may include a material having lower thermal conductivity than the first bent surface of the first forming part and the second bent surface of the second forming part.

Also, the first surface of the first forming part and the second surface of the second forming part may include a Teflon material, and the first bent surface of the first forming part and the second bent surface of the second forming part may be formed of an aluminum material.

Also, the second mold may include a mold body that is moveable and provided with the second forming part on a surface facing the first forming part; a pressing plate that is moveable and formed to face the seating part and be supported by the mold body; and an elastic member interposed between the mold body and the pressing plate.

Also, the second mold may further include a through hole formed in a region of the pressing plate corresponding to a path through which the second forming part moves.

DETAILED DESCRIPTION

Hereinafter, embodiments according to the disclosure will be described in detail with reference to the accompanying drawings. The embodiments described with reference to the drawings are not mutually exclusive unless otherwise specified, and a plurality of embodiments may be selectively combined and implemented in one device. A combination of a plurality of the embodiments may be arbitrarily selected and applied by a person skilled in the art in implementing the spirit of the disclosure.

If there is a term including an ordinal number such as a first component, a second component, etc. in the embodiment, these terms are used to describe various components and distinguish one component from another component and the meaning of the components is not limited by the terms. The terms used in the embodiments are applied to describe the embodiments and do not limit the spirit of the disclosure.

In addition, the expression "at least one" among a plurality of components appearing in the present specification refers to the entire plurality of components as well as each of the components excluding the rest of the components or any combination of the components.

Figure 1:
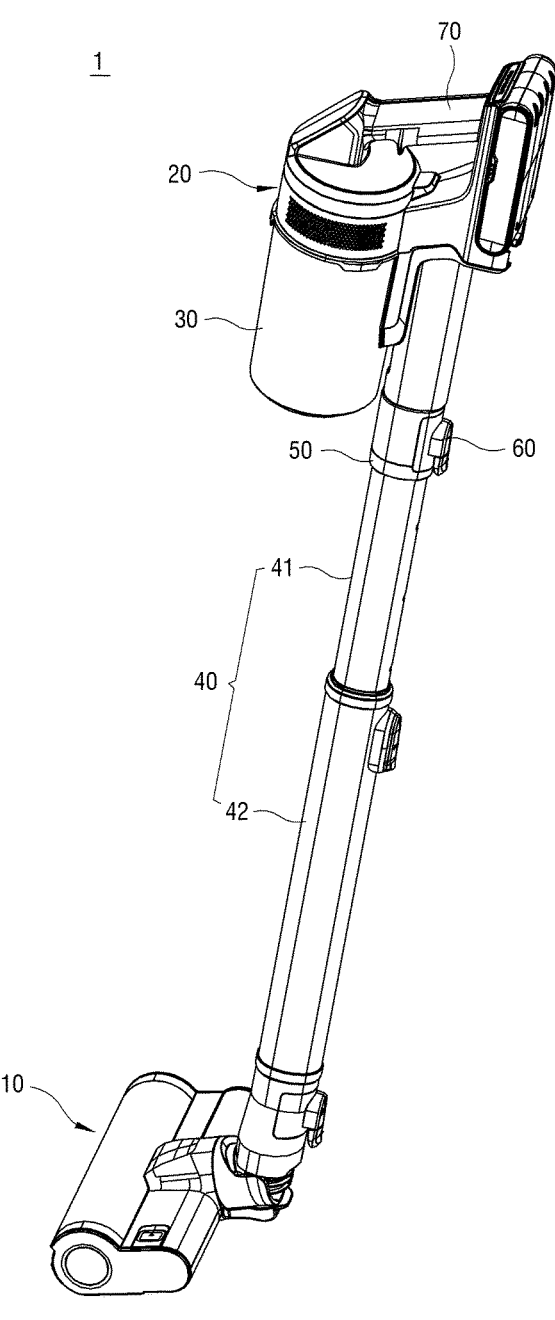
FIG. 1 is a perspective view showing a vacuum cleaner.

FIG. 1 is a perspective view showing a vacuum cleaner.

As shown in FIG. 1, the vacuum cleaner 1 according to the embodiment of the disclosure is expressed as a grip type cleaner in which a user can hold a cleaner body 20 and perform cleaning. However, the vacuum cleaner 1 to which the spirit of the disclosure can be applied is not limited to the grip type and includes a vacuum cleaner having various structures such as a shape in which the cleaner body is placed on a floor.

The vacuum cleaner 1 includes a cleaning head 10 provided to suck foreign substances on a surface to be cleaned such as a floor by a suction force to the air. The cleaning head 10 is provided to suck various foreign substances such as dust, fine dust, mold, etc. existing on the surface to be cleaned while moving in contact with the surface to be cleaned.

In addition, the vacuum cleaner 1 includes the cleaner body 20 provided to collect the foreign substances sucked through the cleaning head 10. The cleaner body 20 includes a motor (not shown) which will be described later for generating a suction force required to suck the foreign substances on the surface to be cleaned and a dust collecting part 30 in which the foreign substances sucked from the surface to be cleaned are accommodated. In the embodiment of the disclosure, the dust collecting part 30 is a cyclone type but this is only an example and the type of the dust collecting part 30 applied to the vacuum cleaner 1 is not limited. The dust collecting part 30 is provided in a form of a container in which the dust separated by the centrifugal force is accommodated. The dust collecting part 30 may be detachably coupled to the cleaner body 20 and, while coupled, is sealed so that the dust contained therein does not leak.

The vacuum cleaner 1 includes a suction pipe 40 provided to connect between the cleaning head 10 and the cleaner body 20. The suction pipe 40 includes a first pipe 41 connected to the cleaner body 20 and a second pipe 42 connected between the first pipe 41 and the cleaning head 10.

The cleaner body 20 includes a suction nozzle 50 provided to be connected to the first pipe 41. The suction nozzle 50 has a suction port through which the first pipe 41 can be inserted. The suction nozzle 50 in which the first pipe 41 is inserted and connected to is formed in a longitudinal direction of the first pipe 41. The suction nozzle 50 includes a suction nozzle connector 60 provided so that the first pipe 41 can be detachably connected.

The cleaner body 20 includes a handle 70 provided to be gripped by a user. The user can move the cleaner body 20 and the cleaning head 10 by holding the handle 70.

Hereinafter, a structure of the cleaner body 20 will be described.

Figure 2:
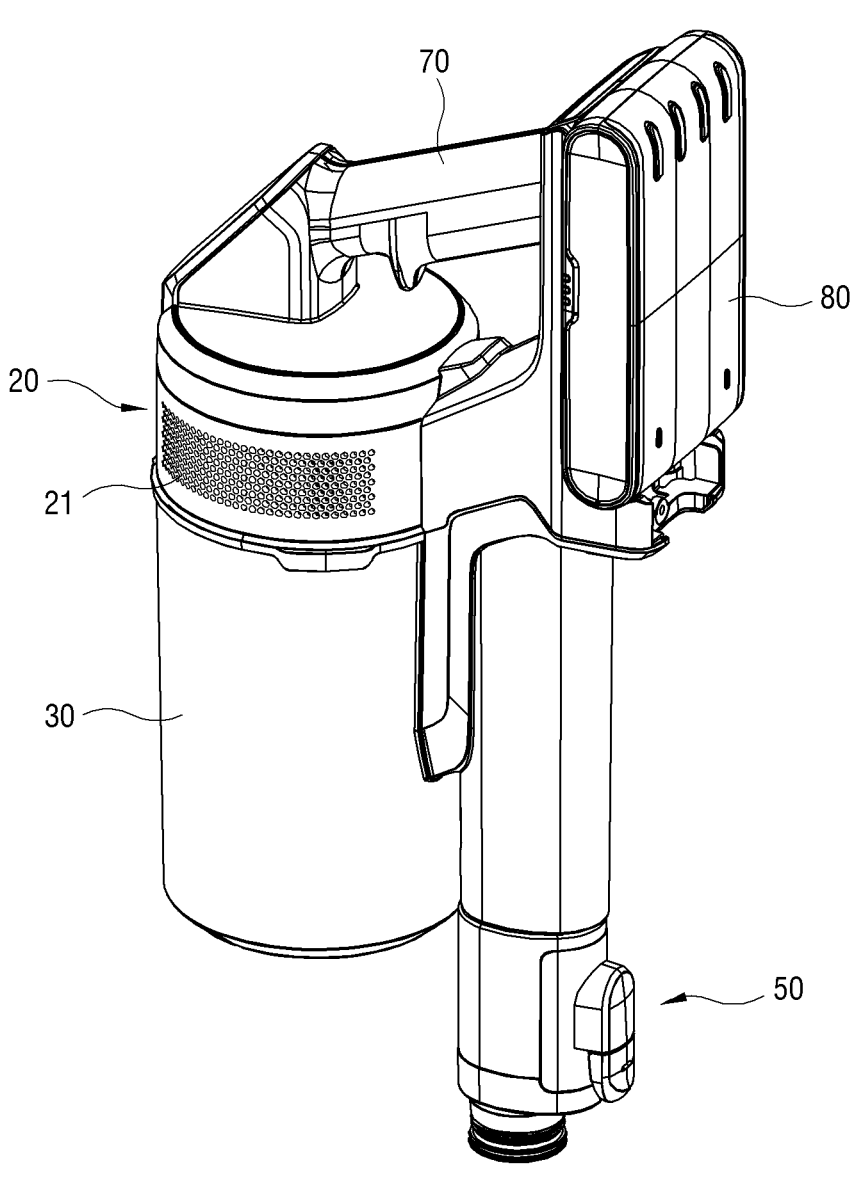
FIG. 2 is a perspective view showing a main body of the vacuum cleaner.

FIG. 2 is a perspective view showing a main body of the vacuum cleaner.

As shown in FIG. 2, the cleaner body 20 includes a discharge part 21 for discharging the air sucked into the cleaner body 20 to the outside. The discharge part 21 includes a plurality of holes provided in the cleaner body 20. The dust collecting part 30 is coupled to a lower side of the cleaner body 20. When the air is sucked into the cleaner body 20 through the suction nozzle 50, dust contained in the air is collected and accommodated in the dust collecting part 30 and the air from which the dust has been filtered is discharged to the outside of the cleaner body 20 through the discharge part 21.

The cleaner body 20 includes a power supply part 80 for supplying an operating power. The power supply part 80 includes circuitry for converting a supplied power into the operating power and is provided to receive an external power through a power cable or to include a battery.

Hereinafter, an internal structure of the cleaner body 20 will be described.

Figure 3:
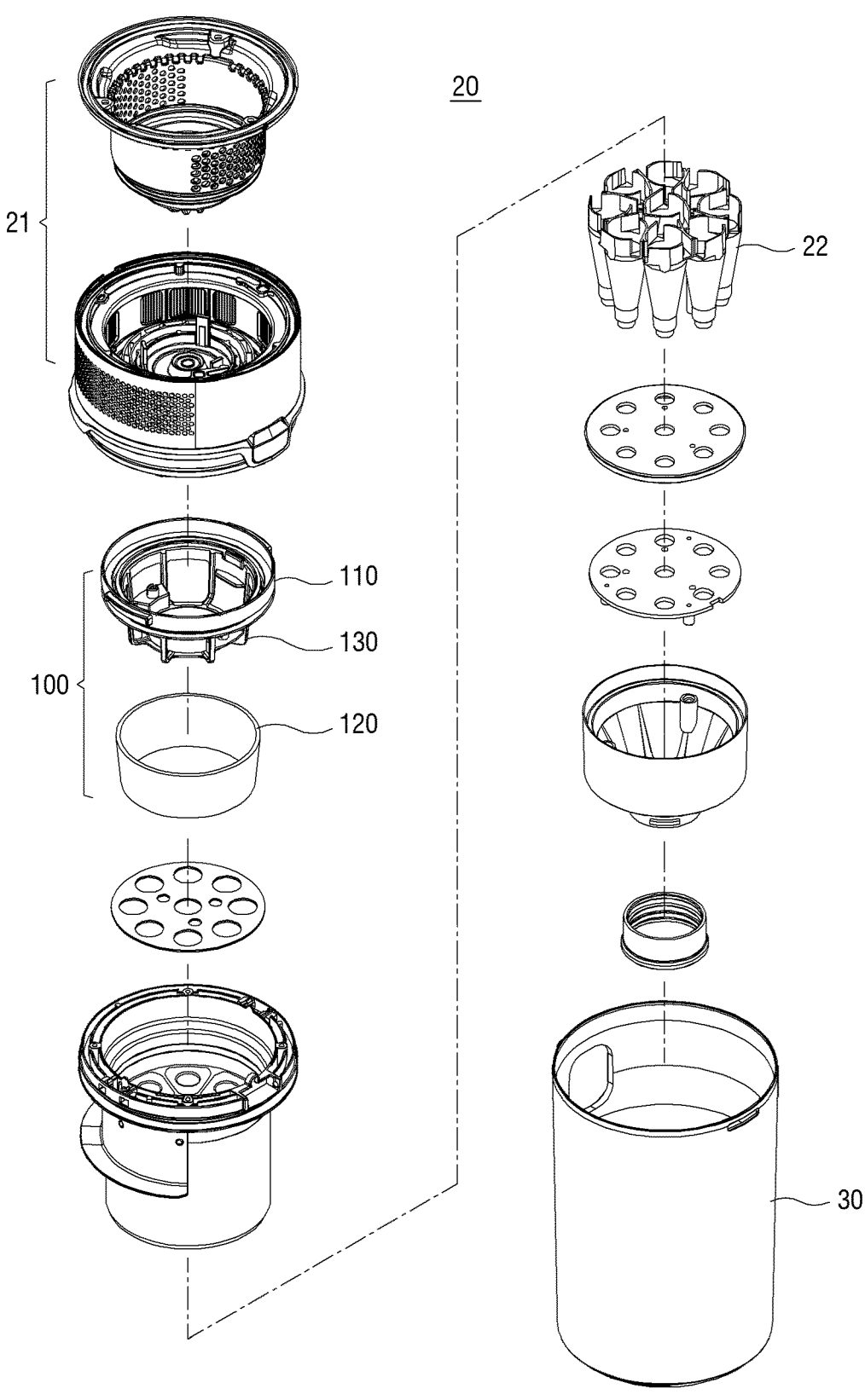
FIG. 3 is an exploded perspective view illustrating an internal structure of a cleaner body of the vacuum cleaner.

FIG. 3 is an exploded perspective view illustrating an internal structure of the cleaner body of the vacuum cleaner.

As shown in FIG. 3, the cleaner body 20 according to the present embodiment applies a cyclone method for generating a swirling air flow to separate the air and the dust by a centrifugal force. However, the method of separating the air and the dust is not limited to the cyclone method. According to a design method, the cleaner body 20 may be a structure which is applied with any one of a dust bag method capable of passing the air through a filter bag to filter the dust or other known methods separating the foreign substances.

The cleaner body 20 includes a plurality of cones 22 for dust collection. The air sucked into the cleaner body 20 is given a specified turning force so that the air turns inside the plurality of cones 22 and is separated from the dust. Depending on a design method, the cleaner body 20 may further include a spiral flow guide member for inducing the rotation of the incoming air.

An example of the operation of separating the dust from the air is as follows. The air sucked into the cleaner body 20 rotates primarily by the turning force applied by the flow guide member or the like. Accordingly, the dust which is relatively heavy is separated radially outward by the centrifugal force and is collected by the dust collecting part 30. In addition, when the turning force is additionally applied to the air by the plurality of cones 22, the dust is additionally separated from the air. The air passing through the plurality of cones 22 arrives at the filter 100. The filter 100 includes a frame 110 supported in the cleaner body 20 and a filter member 120 supported by the frame 110 and provided to allow the air to pass through the filter member 120. The frame 110 has a ring-shaped structure having an opening at a center through which the air passes and the air passing through the filter member 120 passes the opening of the frame 110.

In a process of the air passing through the filter member 120, fine dust contained in the air is filtered out. The air that has passed through the filter 100 is discharged to the outside of the cleaner body 20 through the discharge part 21. Depending on a design method, the filter 100 may further include a support member 130 which is coupled to the frame 110 and supports at an inner side with regard to the filter member 120 to maintain the shape of the filter member 120 so as to assist the filter member 120 to perform the filtering function properly.

Hereinafter, a structure of the filter 100 according to the present embodiment will be described in detail.

Figure 4:
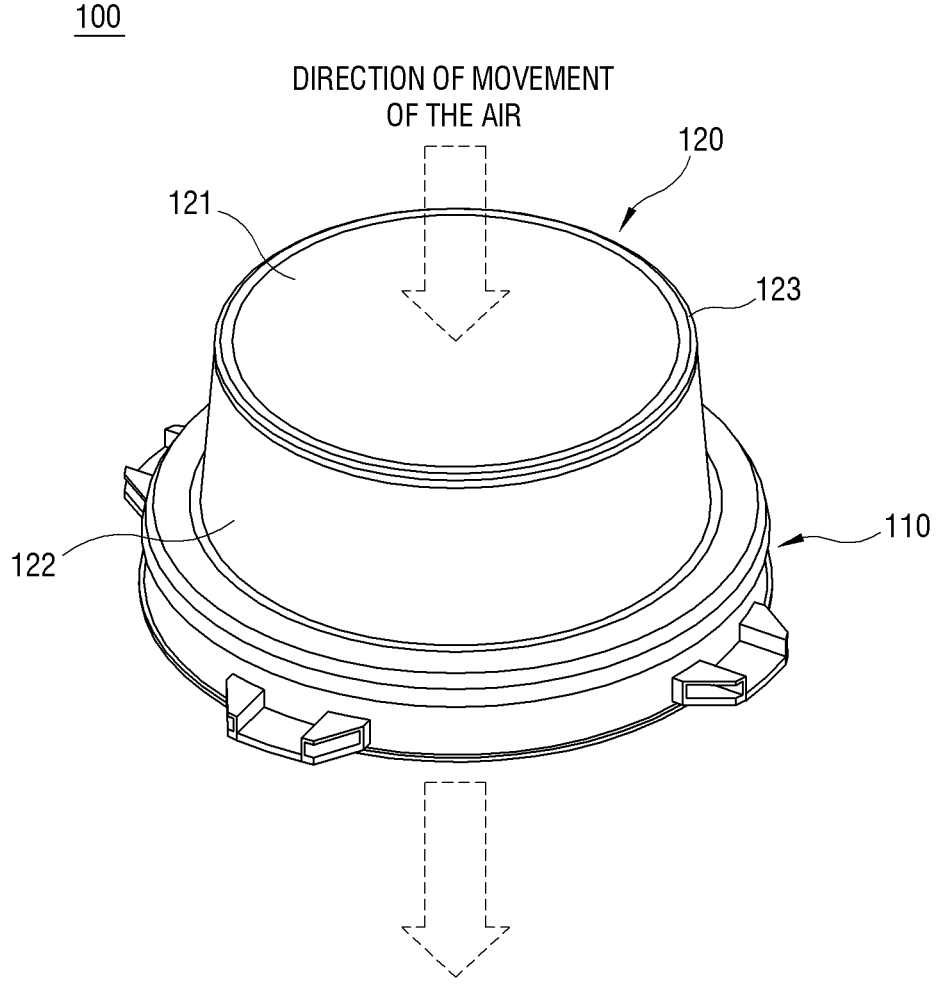
FIG. 4 is a perspective view of a filter applied to the vacuum cleaner.

FIG. 4 is a perspective view of the filter applied to the vacuum cleaner.

Figure 5:
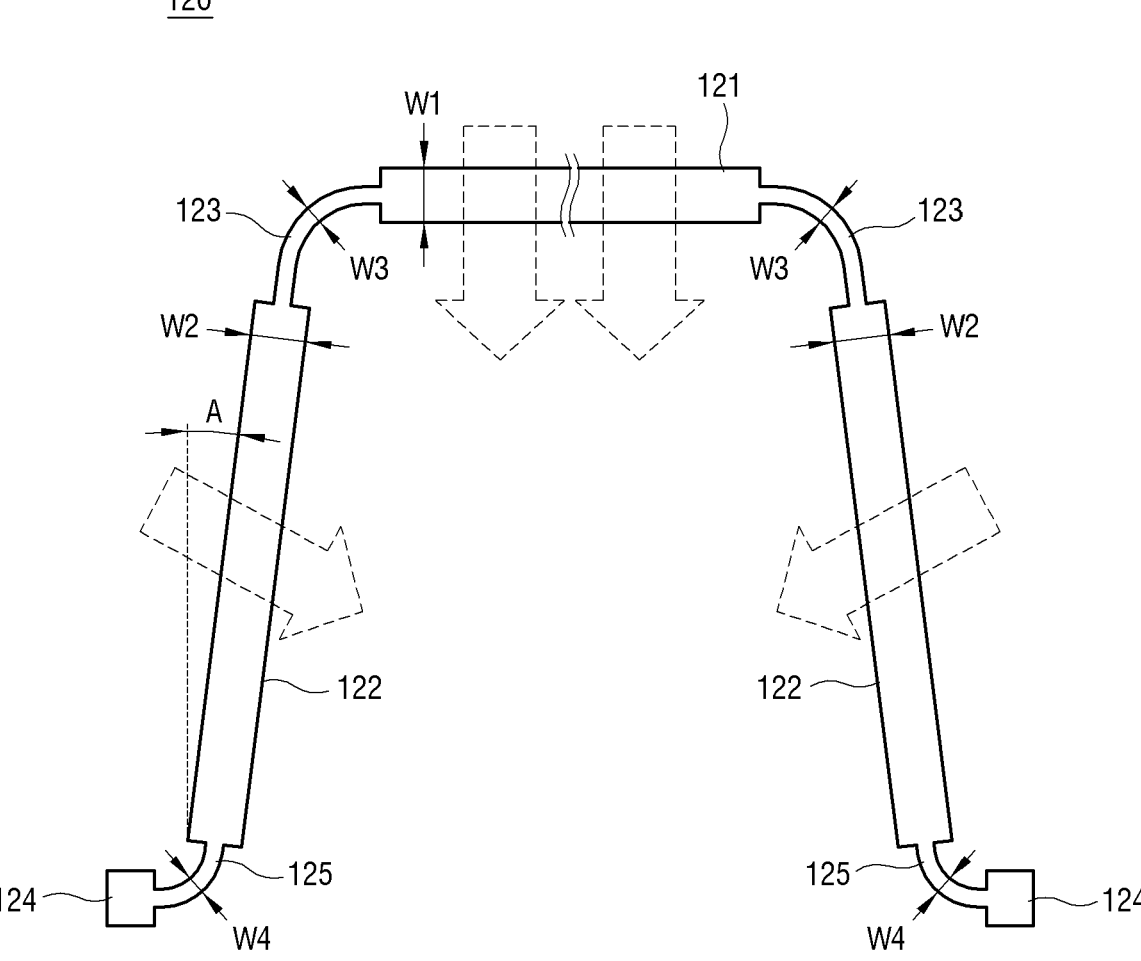
FIG. 5 is a side sectional view of a filter member of the filter.

FIG. 5 is a side sectional view of the filter member of the filter.

As shown in FIGS. 4 and 5, the filter 100 disposed on the flow path of the air in the cleaner body 20 (see FIG. 1) includes the frame 110 and the filter member 120 supported by the frame 110. The frame 110 has a circular or polygonal shape forming an opening at the center through which the air passes. The filter member 120 includes a first filter part 121 spaced apart from and parallel with the opening formed in the frame 110, a second filter part 122 of which one side is supported by the frame 110 and the other side extends from the one side toward an edge of the first filter part 121 and a first bent part 123 bent between the first filter part 121 and the second filter part 122 to be an area where an edge of the first filter part 121 and an edge of the second filter part 122 adjoin each other. The first filter part 121, the second filter part 122 and the first bent part 123 have a structure integrated into a single filter member 120.

The frame 110 and the first filter part 121 are disposed in a direction of movement of the air, that is, a direction substantially perpendicular to the flow path. In addition, a diameter of the opening of the frame 110 through which the air passes is provided to be larger than a diameter of the first filter part 121 and, in response to this, the second filter part 122 extends to be inclined at a specified angle A with respect to the flow path. Accordingly, the air moving in the cleaner body 20 (refer to FIG. 1) passes through the first filter part 121 in a straightforward direction while passing through the second filter part 122 in an inclined direction. The angle A may be designed in consideration of various factors such as air speed, air volume, filtering characteristics of the filter member 120, lengths of the first filter part 121 and the second filter part 122, etc. and needs not be limited to a specific value.

In this way, the filter member 120 protrudes from the frame 110 in a direction in which the air enters, thereby increasing the area through which the air passes and improving an effect of air filtering. In addition, since an effective period during which the filter member 120 can be used without washing the filter member 120 is relatively increased, a user's convenience can also be improved.

According to a design method, the filter member 120 may further include a filter end 124 forming an end of the filter member 120 and a second bent part 125 bent between the second filter part 122 and the filter end 124 and forming an area where an edge of the second filter part 122 and an edge of the filter end 124 adjoin each other. Or, in a case of manufacturing in a method where one end of the second filter part 122 is cut off after forming a material sheet and is supported on the frame 110, the filter member 120 does not include the filter end 124 and second bent part 125.

The filter member 120 is manufactured by molding a material sheet having a multi-layer structure. As an example of the material sheet, the material sheet of the filter member 120 has a form in which a microfilter of a polypropylene material is interposed between two-layer meshes made of nylon, non-woven fabric or the like. The filter member 120 is provided by forming the material sheet by heat and pressure. A specific molding method of the filter member 120 using the material sheet will be described later.

The filter member 120 according to the present embodiment is made of an integrated material sheet and has a different thickness for each area. With a thickness of the first filter part 121 being referred to as W1, a thickness of the second filter part 122 as W2 and a thickness of the first bent part 123 as W3, respectively, W1, W2 and W3 are set to satisfy relationships of W1>W3 and W2>W3. W1 and W2 may be substantially the same or different but W3 is provided to be smaller than W1 and W2. In addition, with a thickness of the second bent part 125 being referred to as W4, W1, W2 and W4 are set to satisfy relationships of W1>W4 and W2>W4. W3 and W4 may be substantially the same or different.

As described above, the reason that each thickness of the first filter part 121 and the second filter part 122 is greater than the thickness of the first bent part 123 relates to a use condition required for the filter member 120 and the molding method of the filter member 120. Due to a characteristic of the shape of the filter member 120 in which the first filter part 121 faces a movement direction of the air, maintaining the overall shape of the filter member 120 during an operation of the vacuum cleaner largely relates to the filtering function of the filter 100.

A filter member according to a related art different from an embodiment of the disclosure is manufactured by separately providing a material sheet corresponding to the first filter part 121 and a material sheet corresponding to the second filter part 122 and pressing a seam of the two material sheets to a separate support member. Due to a characteristic of the material sheet, an area which has been pressed loses the filtering function. Because the area of the two material sheets pressed to the support member becomes relatively large in the filter member, a filterable area becomes reduced consequently. In addition, a weight of the support member itself may also become a factor to hinder the maintaining of the shape of the filter member.

In contrast, the filter member 120 according to the present embodiment is provided with the first filter part 121 and the second filter part 122 being integrated by molding a single material sheet. The filter member 120 is manufactured by thermally pressing only the first bent part 123 to maintain an overall rigidity of the filter member 120 while maintaining the filtering function of the first filter part 121 and the second filter part 122. Thereby, W3 becomes smaller than W1 and W2. Since the filter member 120 has a smaller compressed area compared to the filter member using the support member according to the related art, the filterable area is increased, the weight of the filter member 120 is reduced, the structure of the filter member 120 can be simplified and a yield can be guaranteed. In addition, according to the present embodiment, a number of manufacturing processes is shortened compared to the related art and, accordingly, a number of workers required in the manufacturing processes is reduced. In addition, according to this embodiment, since the support member used in the related art is not used and the area to be compressed of the material sheet to be coupled to the support member can be reduced, a waste of the material sheet can be reduced compared to the related art.

Hereinafter, a mold device for manufacturing the filter member 120 according to the present embodiment will be described.

Figure 6:
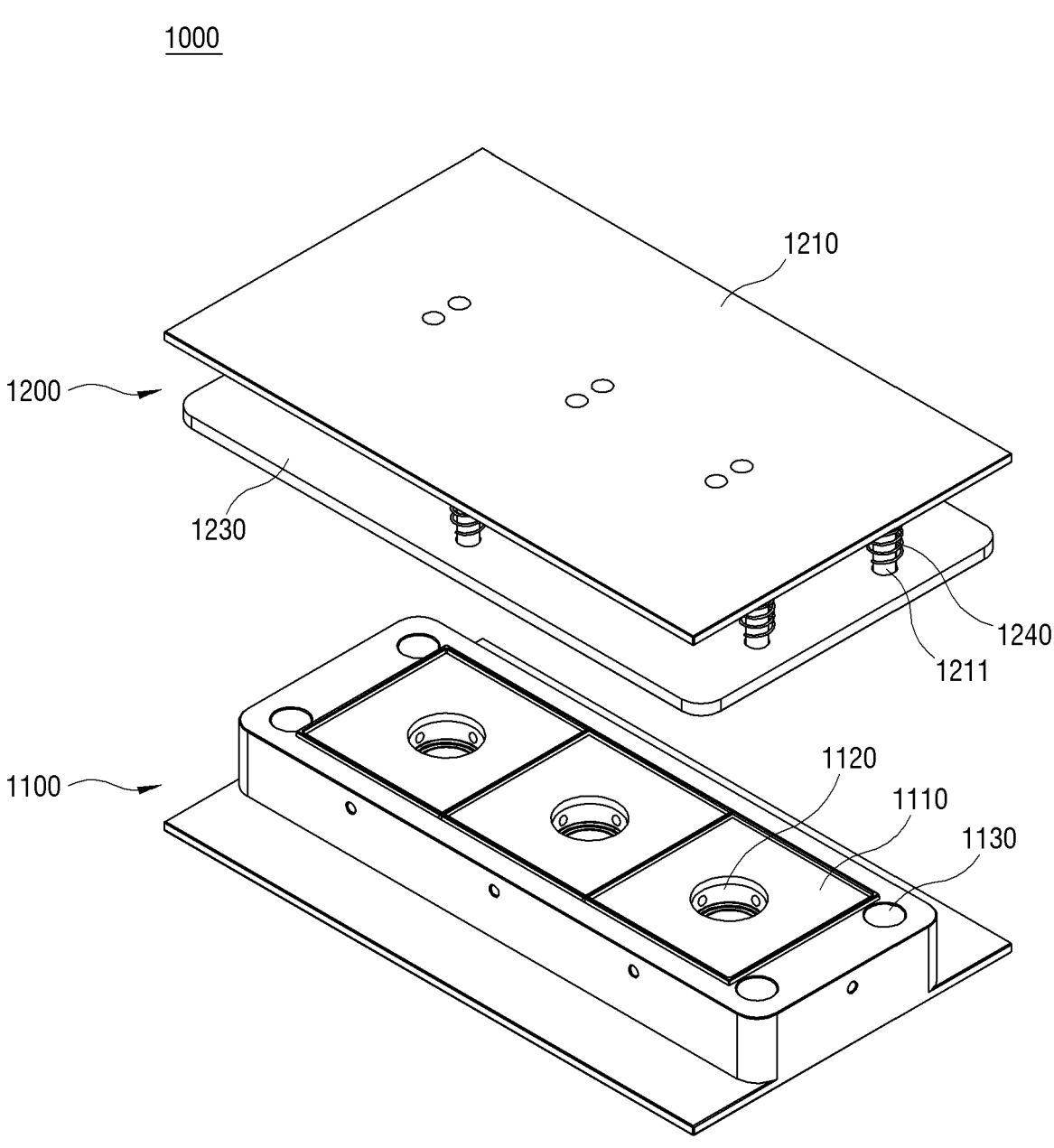
FIG. 6 is a perspective view from above illustrating the mold device for molding the filter member.

FIG. 6 is a perspective view from above illustrating the mold device for molding the filter member.

Figure 7:
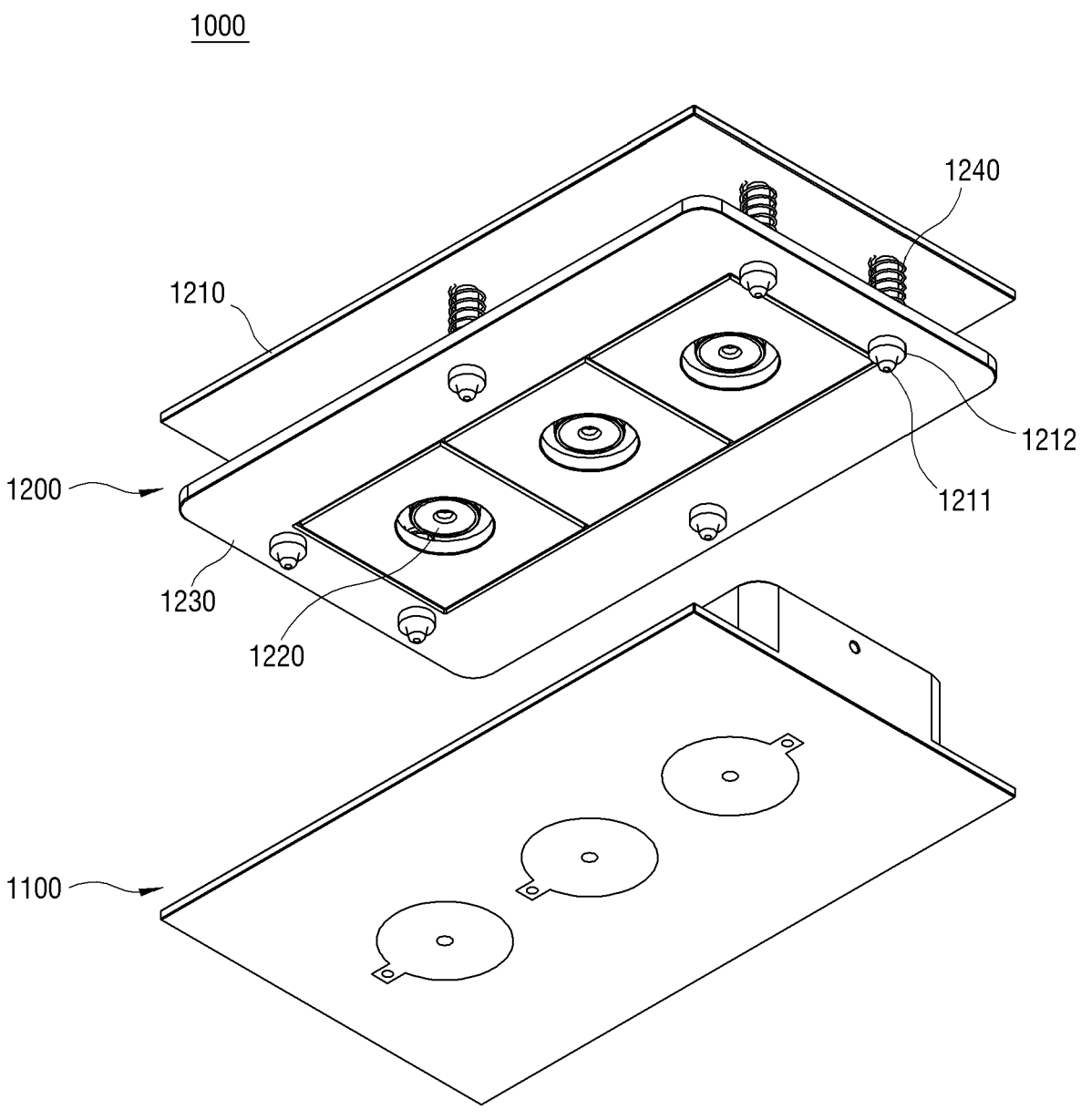
FIG. 7 is a perspective view from below illustrating the mold device.

FIG. 7 is a perspective view from below illustrating the mold device.

Figure 8:
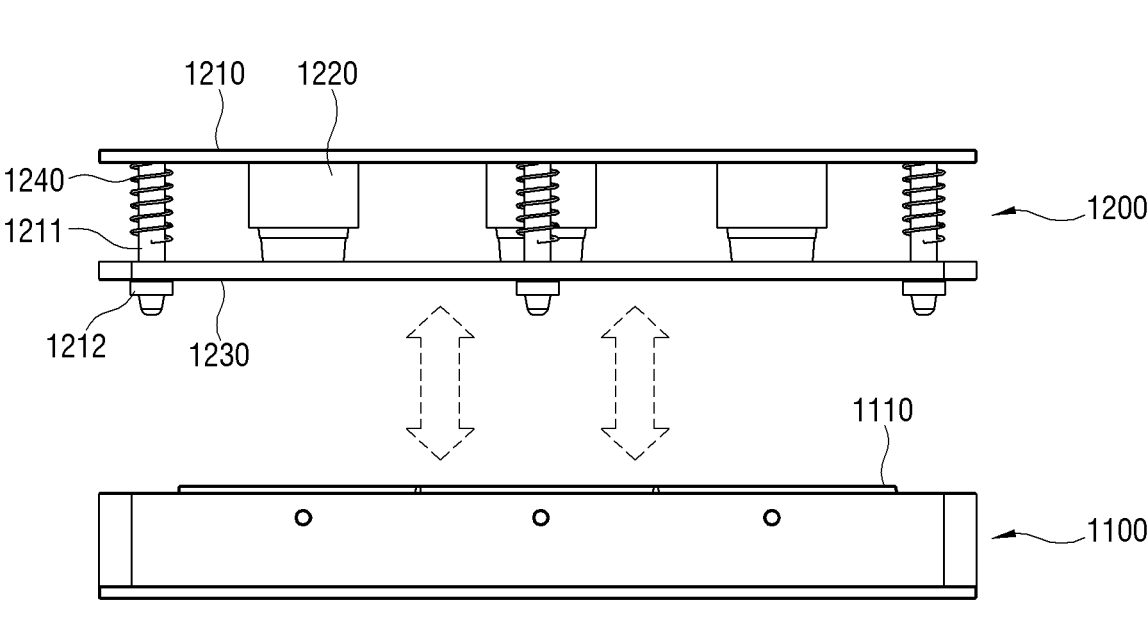
FIG. 8 is a side view illustrating the mold device.

FIG. 8 is a side view illustrating the mold device.

As shown in FIGS. 6, 7 and 8, a mold device 1000 includes a first mold 1100 disposed on a lower side and a second mold 1200 disposed on an upper side to face the first mold 1100. In this embodiment, the first mold 1100 is fixed and the second mold 1200 is provided to be movable so as to be close to or spaced apart from the first mold 1100. In addition, the mold device 1000 further includes a motor that provides a driving force for moving the second mold 1200 and a heater that applies heat to the second mold 1200. The mold device 1000 molds a shape of the filter member 120 (refer to FIG. 4) by pressing a material sheet seated on the first mold 1100 with the second mold 1200. When the molded filter member is cut from the material sheet, the filter member is coupled to the frame 110 (refer to FIG. 4) according to an injection method. Thereby, the filter 100 (refer to FIG. 4) is manufactured.

The shape of the first mold 1100 is not limited but, for example, has a hexahedral shape as a whole. The first mold 1100 is formed on an upper surface of the first mold 1100 facing the second mold 1200 and includes a seating part 1110 provided to seat the material sheet. Also, the first mold 1100 includes a first forming part 1120 that is recessed from the seating part 1110 to correspond to the shape of the filter member. In the present embodiment, it is shown that there are three first forming parts 1120 in the first mold 1100, but the number of first forming parts 1120 is not limited to a specific numerical value. A detailed structure of the first forming part 1120 will be described later. The first mold 1100 includes a plurality of rod accommodating parts 1130 which are formed to be recessed from the seating part 1110 and respectively accommodate ends of a plurality of rods 1211 to be described later.

The second mold 1200 includes a second mold body 1210 that is movable so as to be adjacent to or spaced apart from the first mold 1100. Depending on a design method, a heater may be built in the second mold body 1210. The second mold body 1210 includes the plurality of rods 1211 protruding toward the first mold 1100. The second mold body 1210 includes stoppers 1212 which have a larger diameter than a diameter of the rods 1211 and are coupled to the end of each rod 1211 for preventing a pressing plate 1230, which will be described later, from being separated from the rods 1211. The rods 1211 and the stoppers 1212 are configured to support the pressing plate 1230, which will be described later.

The second mold 1200 includes a second forming portion 1220 that protrudes from the second mold body 1210 downward to correspond to the first forming portion 1120. The second forming part 1220 is accommodated in the first forming part 1120 as the second mold body 1210 moves and is provided to mold the filter member by pressing the material sheet. A shape of the second forming part 1220 corresponds to a shape of the first forming part 1120 and the material sheet is molded into a shape of the filter member by being applied with heat and pressure in a state where the material sheet is interposed between the first forming part 1120 and the second forming part 1220. At this time, shapes of the first forming part 1120 and the second forming part 1220 are provided so that a thickness of each of the first filter part 121 and the second filter part 122 is greater than a thickness of the bent portion 123 (refer to FIG. 5). The shapes of the first forming part 1120 and the second forming part 1220 corresponding to each other will be described later.

The second mold 1200 includes a pressing plate 1230 that is disposed toward the first mold 1100 to face the seating part 1110 and is movably supported by the second mold body 1210. The pressing plate 1230 has a through hole through which the rod 1211 passes and is provided to be movable up and down along the rod 1211. The pressing plate 1230 is interposed between the second mold body 1210 and the stopper 1212 and a diameter of the through hole of the pressing plate 1230 through which the rod 1211 passes is provided to be smaller than a diameter of the stopper 1212 to prevent the pressing plate 1230 from being separated from the rod 1211.

The second mold 1200 is supported by the rod 1211 and includes an elastic member 1240 interposed between the second mold body 1210 and the pressing plate 1230. The elastic member 1240 according to the present embodiment is shown to include a spring that spirally surrounds the rod 1211 but may be implemented with various types of springs such as a leaf spring and a fluid spring.

In a process in which the mold device 1000 manufactures the filter member using the material sheet, the second mold 1200 may switch among a first position spaced apart from the first mold 1100, a second position in which the pressing plate 1230 presses the material sheet on the seating part 1110 and the second forming part 1220 does not press the material sheet and a third position in which the second forming part 1220 presses the material sheet with regard to the first forming part 1120. Detailed operations for each position will be described later.

Hereinafter, structures of the first forming part 1120 and the second forming part 1220 will be described in more detail.

Figure 9:
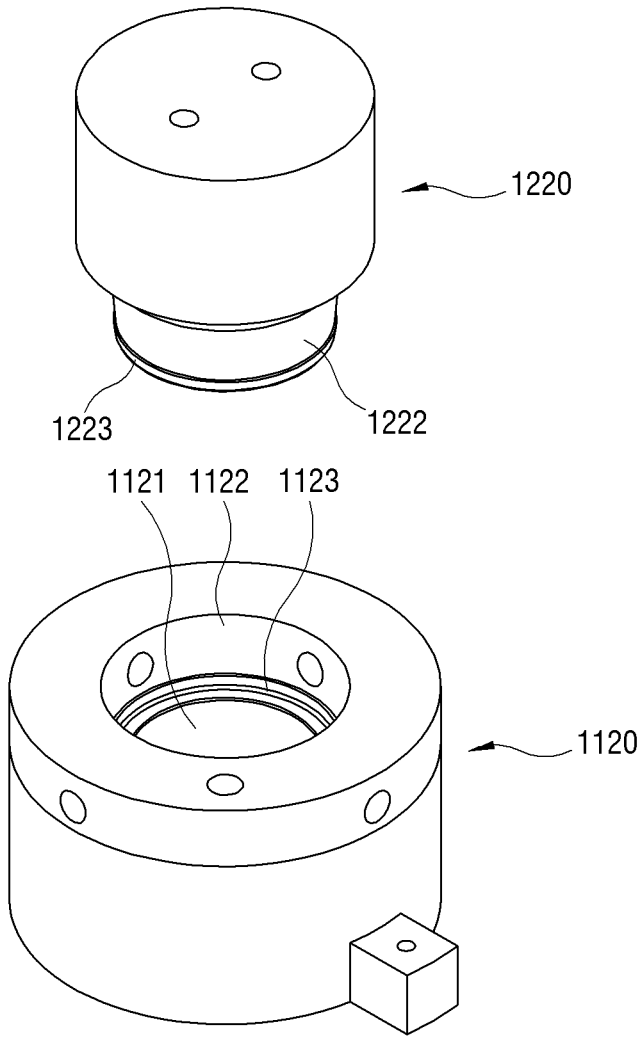
FIG. 9 is a main part perspective view showing structures of a first forming part and a second forming part of the mold device.

FIG. 9 is a main part perspective view showing the first forming part and the second forming part of the mold device.

Figure 10:
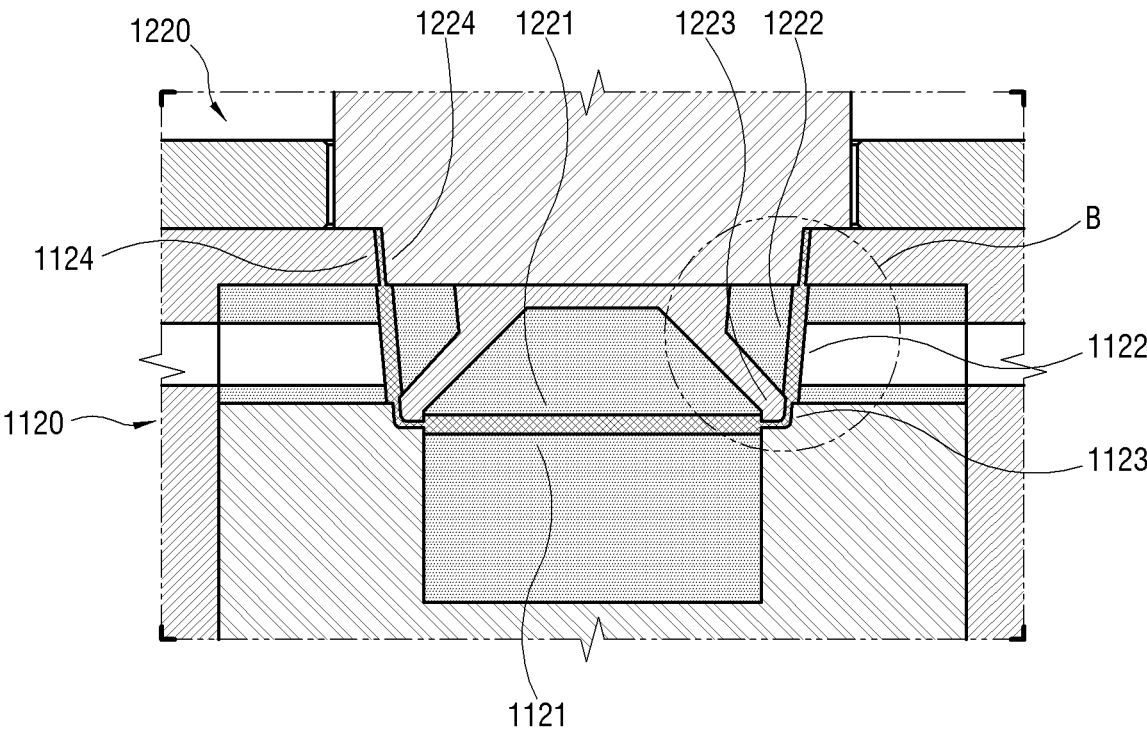
FIG. 10 is a main part side sectional view showing the structures of the first forming part and the second forming part when a second mold is in a third position.

FIG. 10 is a main part side sectional view showing structures of the first forming part and the second forming part when the second mold is in the third position.

Figure 11:
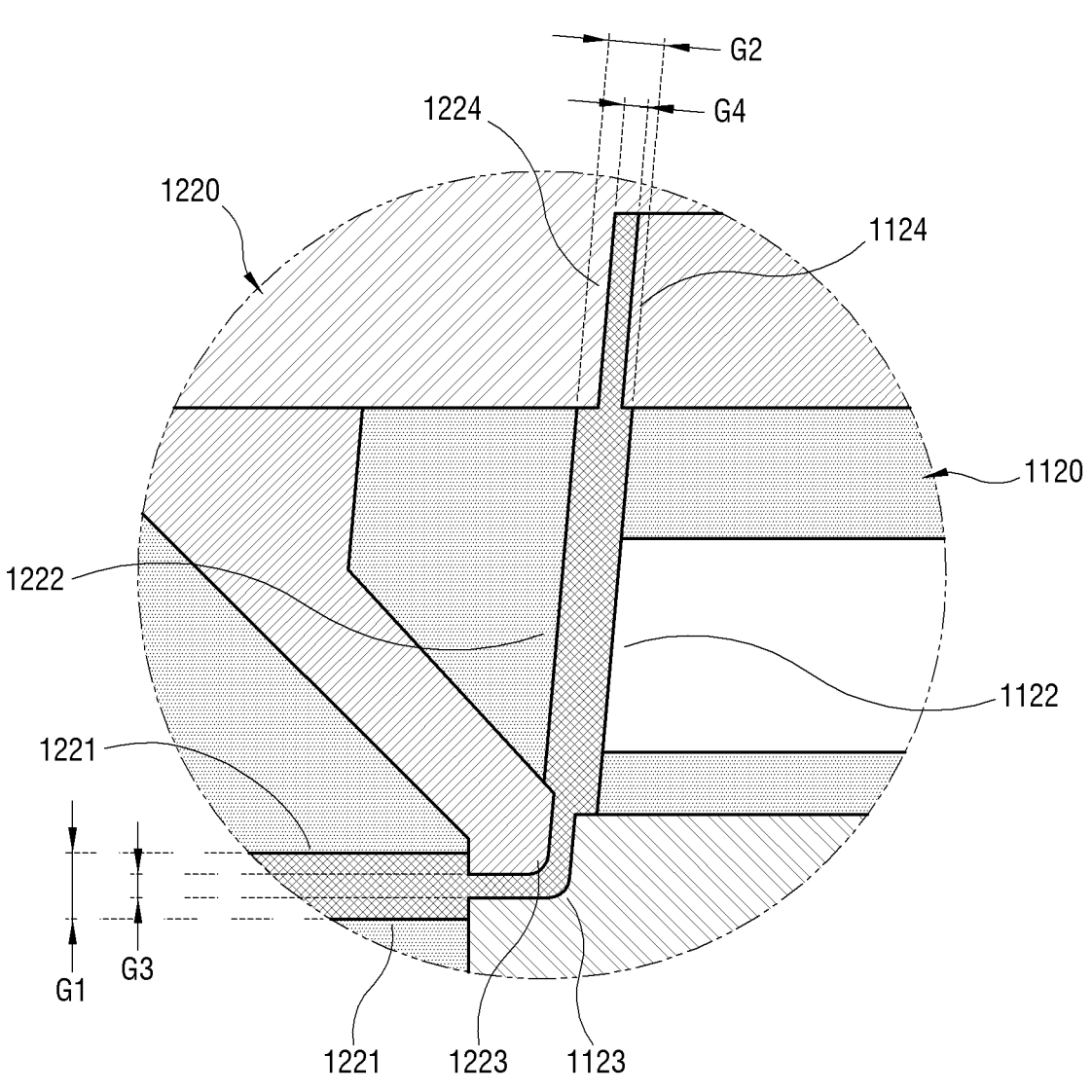
FIG. 11 is a main part side sectional view showing an enlarged state of region B of FIG. 10.

FIG. 11 is a main part side sectional view showing an enlarged state of region B of FIG. 10.

As shown in FIGS. 9, 10 and 11, the first forming part 1120 and the second forming part 1220 are provided to correspond to a shape of the filter member 120 (refer to FIG. 4). The first forming part 1120 has a shape corresponding to an outer surface of the filter member and the second forming part 1220 has a shape corresponding to an inner surface of the filter member. The filter member is manufactured by interposing a material sheet between the first forming part 1120 and the second forming part 1220 and forming the material sheet by heat and pressure. However, as described in the previous embodiment, in order for the filter member to have a different thickness for each part, each of the first forming part 1120 and the second forming part 1220 is provided to have a different material for each part.

The first forming part 1120 includes a first surface 1121 forming a recessed bottom surface, a second surface 1122 forming a side surface, a third surface 1123 forming a bent surface between an edge of the first surface 1121 and a lower edge of the second surface 1122 and a fourth surface 1124 forming an upper edge of the second surface 1122. The first surface 1121 corresponds to an outer surface of the first filter part 121, the second surface 1122 corresponds to an outer surface of the second filter part 122, the third surface 1123 corresponds to an outer surface of the first bent part 123 and the fourth surface 1124 corresponds to an outer surface of the second bent part 124 (refer to FIG. 5).

Here, a material of the first forming part 1120 forming the first surface 1121 and the second surface 1122 has a lower thermal conductivity than a material of the first forming part 1120 forming the third surface 1123 and the fourth surface 1124. Within a range satisfying this condition, the materials of the first forming part 1120 may be provided in various types, for example, the first surface 1121 and the second surface 1122 may include a Teflon material and the third surface 1123 and the fourth surface 1124 may include an aluminum material.

On the other hand, the second forming part 1220 has a fifth surface 1221 forming a protruding front end surface, a sixth surface 1222 forming a side wall, a seventh surface 1223 forming a bent surface between an edge of the fifth surface 1221, and a lower edge of the sixth surface 1222 and an eighth surface 1224 forming an upper edge of the sixth surface 1222. The fifth surface 1221 corresponds to an inner surface of the first filter part 121, the sixth surface 1222 corresponds to an inner surface of the second filter part 122, the seventh surface 1223 corresponds to an inner surface of the first bent portion 123 and the eighth surface 1224 corresponds to an inner surface of the second bent portion 124 (see FIG. 5).

Here, a material of the second forming portion 1220 forming the fifth surface 1221 and the sixth surface 1222 has a lower thermal conductivity than a material of the second forming portion 1220 forming the seventh surface 1223 and the eighth surface 1224. Within a range satisfying this condition, the materials of the second forming part 1220 may be provided in various types, for example, the fifth surface 1221 and the sixth surface 1222 may include a Teflon material and the seventh surface 1223 and the eighth surface 1224 may include an aluminum material.

As described above, the second mold 1200 may move between the first position, the second position and the third position. When the second mold 1200 is in the third position in which the material sheet is pressed between the first forming portion 1120 and the second forming portion 1220 during the process, the first surface 1121 and the fifth surface 1221, the second surface 1122 and the sixth surface 1222, the third surface 1123 and the seventh surface 1223 and the fourth surface 1124 and the eighth surface 1224 are placed in positions to face each other, respectively. At this time, the surfaces facing each other form a gap with each other, the material sheet is interposed in the gap and heat and pressure are applied to the material sheet. A distance between the first surface 1121 and the fifth surface 1221 is G1, a distance between the second surface 1122 and the sixth surface 1222 is G2, a distance between the third surface 1123 and the seventh surface 1223 is G3 and a distance between the fourth surface 1124 and the eighth surface 1224 is G4, where the conditions of G1>G3, G1>G4, G2>G3 and G2>G4 are satisfied.

In addition, heat is applied to the first forming part 1120 and the second forming part 1220 during the forming process but due to the difference in the thermal conductivity of the materials described above, a difference occurs in the heat transferred from each surface to the material sheet. A temperature of the heat transferred to the material sheet from the first surface 1121 and the second surface 1122 of the first forming part 1120 and from the fifth surface 1221 and the sixth surface 1222 of the second forming part 1220 is lower than a temperature of the heat transferred to the material sheet from the third surface 1123 and the fourth surface 1124 of the first forming part 1120 and from the seventh surface 1223 and the eighth surface 1224 of the second forming part 1220.

For example, when heat of 140 degrees is applied, the first surface 1121, the second surface 1122, the fifth surface 1221 and the sixth surface 1222 allows heat of 100 degrees, which is considerably lowered due to the Teflon material, to be transferred to the material sheet. For this reason, regions of the material sheet corresponding to the first filter part 121 and the second filter part 122 (refer to FIG. 5) is not compressed and the filtering function is not lost. On the other hand, the third surface 1123, the fourth surface 1124, the seventh surface 1223 and the eighth surface 1224 allows heat of 140 degrees to be almost directly transferred to the material sheet through the aluminum material. Accordingly, regions of the material sheet corresponding to the first bent portion 123 and the second bent portion 124 are compressed and, instead of losing the filtering function, overall rigidity of the filter member 120 can be maintained (refer to FIG. 5).

Hereinafter, each process according to a positional movement of the second mold 1200 will be described.

Figure 12:
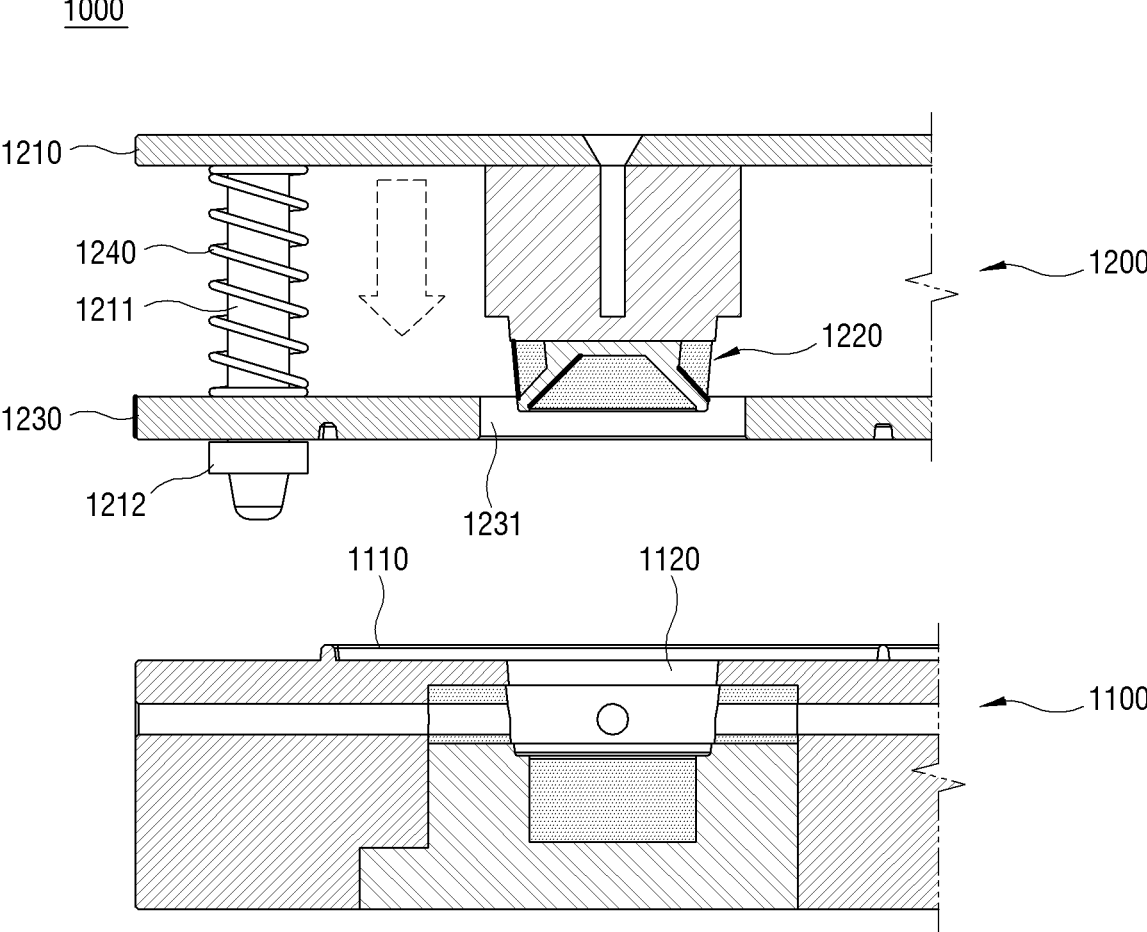
FIG. 12 is a side sectional view showing a state in which the second mold of the mold device is in a first position.

FIG. 12 is a side sectional view showing a state in which the second mold of the mold device is in the first position.

As shown in FIG. 12, the mold device 1000 includes the first mold 1100 and the second mold 1200. In a state in which the first mold 1100 is fixed, the second mold 1200 is positioned at the first position spaced upward a specified distance from the first mold 1100. When the second mold 1200 is in the first position, it is a stage before a manufacturing process of the filter member or a stage where the manufacturing process is completed. At this time, the material sheet prior to manufacturing of the filter member is seated on the seating part 1110 and the material sheet where molding of the filter member has been completed is taken out from the seating part 1110.

When the manufacturing process starts in a state where the second mold 1200 is in the first position and the material sheet is seated on the seating part 1110, the second mold 1200 moves downward to the first mold 1100. While the second mold body 1210 is descending, the pressing plate 1230 is caught on an upper part of the stopper 1212 so as not to be disengaged downward from the rod 1211.

Figure 13:
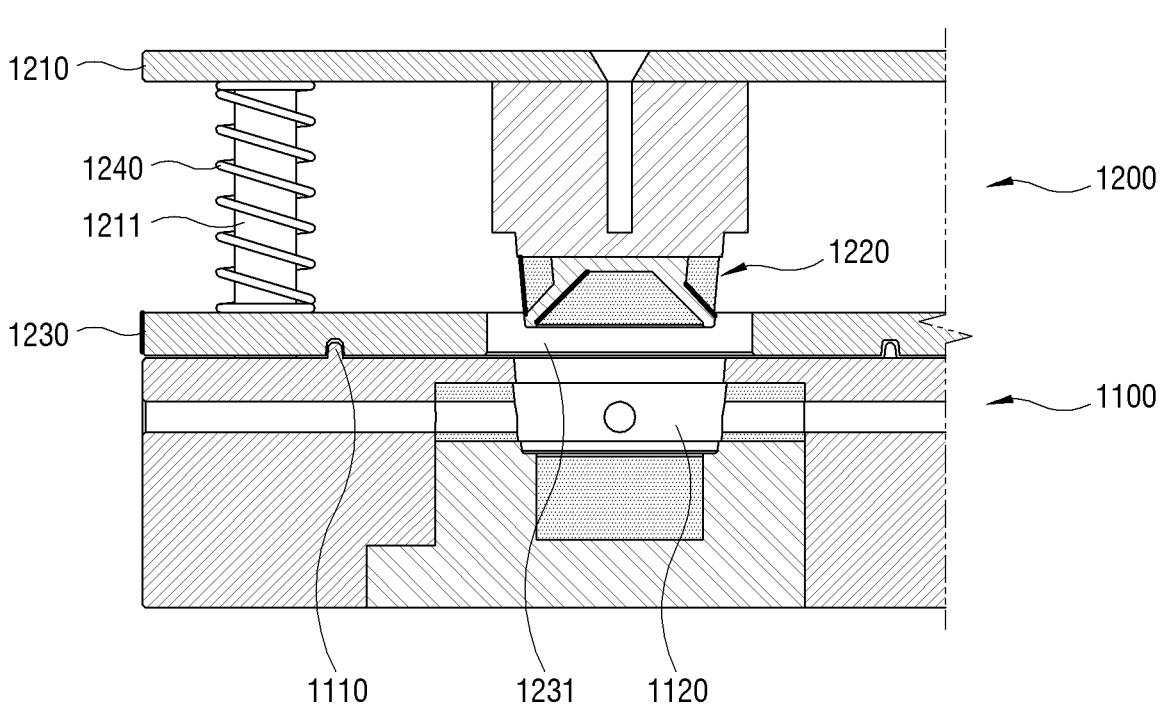
FIG. 13 is a side sectional view showing a state in which the second mold of the mold device is in a second position.

FIG. 13 is a side sectional view showing a state in which the second mold of the mold device is in the second position.

As shown in FIG. 13, when the second mold 1200 descends and reaches the second position, the pressing plate 1230 presses the material sheet on the seating part 1110, while the second forming portion 1220 is not accommodated in the first forming part 1120 and is not in contact with the material sheet. The mold device 1000 applies heat and pressure to the entire material sheet except for the through hole 1231 by maintaining the second mold 1200 in the second position for a specified time. Here, the through hole 1231 is formed on a movement path of the second forming part 1220 so as not to interfere with the movement path on the pressing plate 1230. The heat and pressure applied to the material sheet from the pressing plate 1230 are set within a range in which the material sheet is not compressed and the filtering function is maintained.

When the second mold 1200 starts to descend again from the second position, the second mold body 1210 passes the second forming part 1220 through the through hole 1231 and is accommodated in the first forming part 1120. The second forming part 1220 moves while pressing the material sheet on an accommodation area of the first forming part 1120 toward the first forming part 1120. At this time, the rod 1211 passes through the pressing plate 1230 and is accommodated in the rod accommodating part 1130 (see FIG. 6) and the pressing plate 1230 maintains a position on the seating part 1110. The elastic member 1240 activates an elastic force between the second mold body 1210 and the pressing plate 1230 and, while the second forming part 1220 moves downward as pressing the material sheet, the pressing plate 1230 supports the material sheet by the elastic force.

Figure 14:
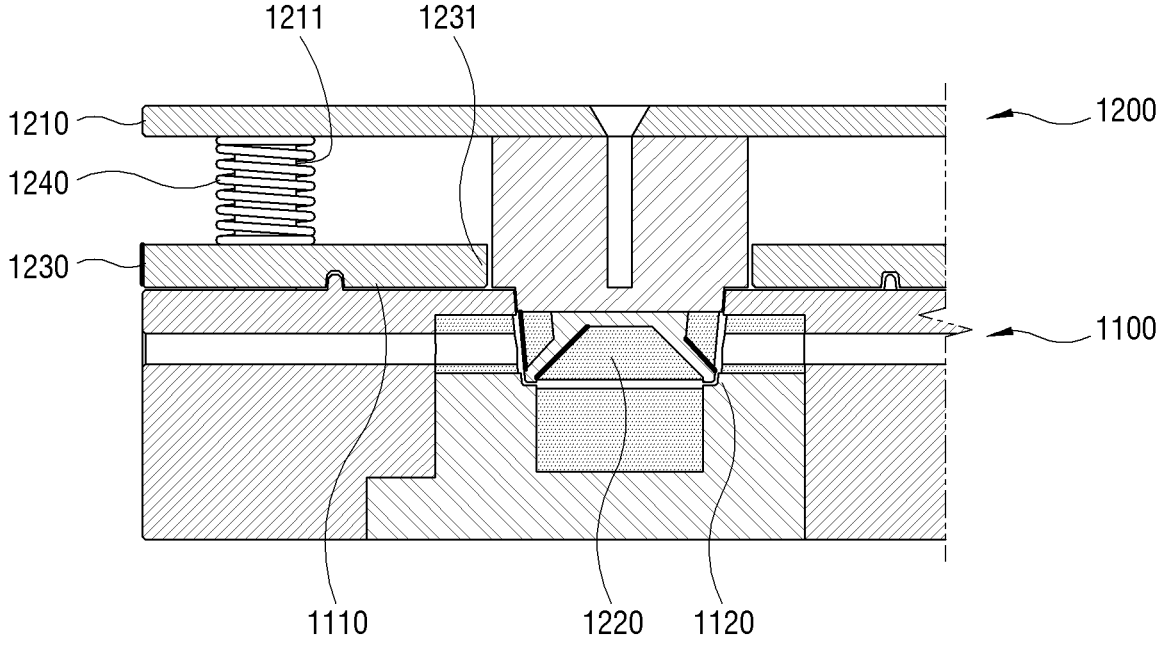
FIG. 14 is a side sectional view showing a state in which the second mold of the mold device is in the third position.

FIG. 14 is a side sectional view showing a state in which the second mold of the mold device is in the third position.

As shown in FIG. 14, while the pressing plate 1230 presses and supports the material sheet, the second mold 1200 moves to the third position where the second forming part 1220 is completely accommodated in the first forming part 1120 as pressing the material sheet. When the second mold 1200 is in the third position, the material sheet is interposed between the first forming part 1120 and the second forming part 1220 which form the filter member 120 (refer to FIG. 4) by applying heat and pressure to the material sheet. Here, each surface of the first forming part 1120 and the second forming part 1220 has a material having a different thermal conductivity depending on a part of the filter member as described in the previous embodiment. Therefore, the regions of the material sheet corresponding to the first bent portion 123 and the second bent portion 124 are compressed with heat and pressure to strengthen the rigidity, while the regions of the material sheet corresponding to the first filter portion 121 and the second filter part 122 maintain the filtering function (refer to FIG. 5).

When molding is completed by maintaining the second mold 1200 at the third position for a specified time, the second mold 1200 moves upward to the first position (see FIG. 12). A region corresponding to the filter member is cut from the material sheet and an end part of the cut filter member is coupled to the frame 110 (refer to FIG. 4), thereby completing the filter member.

According to the mold device 1000 and the manufacturing process having the structure as described above, the filter member with enhanced rigidity and an improved filtering function may be provided.

What is claimed is:

1. A vacuum cleaner comprising:
a suction part configured to suck in air from an outside;
a discharge part configured to discharge the sucked air to the outside; and a filter including:
a frame along a flow path between the suction part and the discharge part and including an opening through which the sucked air passes, and
a filter member supported by the frame and configured to separate dust from the sucked air, the filter member including:
a first filter part spaced from and parallel to the opening,
a second filter part having one side supported by the frame and another side extending from the one side toward an edge of the first filter part, and
a bent part between the edge of the first filter part and the another side of the second filter part, and
wherein a thickness of the first filter part er is greater than a thickness of the bent part and a thickness of the second filter part is greater than the thickness of the bent part.

2. The vacuum cleaner according to claim 1, wherein the filter member has the first filter part, the second filter part and the bent part which are integrated.

3. The vacuum cleaner according to claim 1, wherein the first filter part is upstream relative to the frame along a direction in which the sucked air moves.

4. The vacuum cleaner according to claim 1, wherein a diameter of the frame is greater than a diameter of the first filter part.

5. The vacuum cleaner according to claim 1, wherein the filter member is formed by stacking microfilters among a plurality of mesh sheets.

6. The vacuum cleaner according to claim 1, wherein the bent part is molded by compressing a region of the filter member by heat.

7. A mold device for a filter of a vacuum cleaner, the filter including a frame including an opening, and a filter member supported by the frame, the filter member including: a first filter part spaced from and parallel to the opening, a second filter part having one side supported by the frame and another side extending from the one side toward an edge of the first filter part, and a bent part between the edge of the first filter part and the another side of the second filter part, wherein a thickness of the first filter part is greater than a thickness of the bent part and a thickness of the second filter part is greater than the thickness of the bent part, the mold device comprising:
a first mold including:
a seating part on which a material of a the filter member is seatable; and
a first forming part recessed from the seating part and having a shape corresponding to a shape of the filter member, the first forming part including a first surface, a second surface, and a first bent surface bent between the first surface and the second surface and that is bent,
a second mold that faces the first mold and is moveable with respect to the first mold, the second mold including:
a second forming part having a third surface, a fourth surface, and a second bent surface between the third surface and the fourth surface and that is bent, the third surface, the fourth surface, and the second bent surface respectively having shapes corresponding to the first surface, the second surface, and the first bent surface of the first forming part,
wherein the mold device is configured to press the material between the first forming part and the second forming part according to a movement of the second mold, and with the material seated on the seating part and the second mold moved with respect to the first mold to press the material, the material is pressed between the first forming part and the second forming part such that, a first gap corresponding to the first filter part is formed between the first surface and the third surface, the first gap having a first gap distance that corresponds to the thickness of the first filter part and that is greater than a bent gap distance between the first bent surface and the second bent surface and that corresponds to the thickness of the bent part, and a second gap corresponding to the second filter part is formed between the second surface and the fourth surface, the second gap having a second gap distance that corresponds to the thickness of the second filter part and that is greater than the bent gap distance.

8. The mold device according to claim 7, further comprising a heater configured to heat the first forming part and the second forming part, wherein the first surface of the first forming part and the second surface of the second forming part include a material having lower thermal conductivity than the first bent surface of the first forming part and the second bent surface of the second forming part.

9. The mold device according to claim 8, wherein the first surface of the first forming part and the second surface of the second forming part include polytetrafluoroethylene (PTFE), and the first bent surface of the first forming part and the second bent surface of the second forming part include aluminum.

10. The mold device according to claim 7, wherein the second mold includes:

a mold body that is moveable and provided with the second forming part on a surface that faces the first forming part;

a pressing plate that is moveable relative to the mold body, faces the seating part, and be supported by the mold body; and an elastic member interposed between the mold body and the pressing plate.

11. The mold device according to claim 10, wherein the second mold further includes a through hole formed in a region of the pressing plate that corresponds to a path through which the second forming part is moveable.

\* \* \* \* \*